US012561645B2

(12) United States Patent
Kumar et al.

(10) Patent No.: US 12,561,645 B2
(45) Date of Patent: Feb. 24, 2026

(54) METHODS AND SYSTEMS FOR RE-ESTIMATING STOCK

(71) Applicant: JIO PLATFORMS LIMITED, Ahmedabad (IN)

(72) Inventors: Akansha Kumar, Hyderabad (IN); Harish Lingam, Mahabubnagar (IN); Swargam Santhosh, Warangal Urban (IN); Manoj Reddy Lakkireddy, Hyderabad (IN); Pranay Reddy Chen Reddy, Wanaparthy (IN); Kamlesh Dhondge, Pune (IN); Manoj Kumar Saraswat, Hyderabad (IN); Kamlakar Gadegaonkar, Navi Mumbai (IN); Parishekh Chandra Garg, Navi Mumbai (IN); Milind Naik, Mumbai (IN); Sandesh Dashrath Dalvi, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 359 days.

(21) Appl. No.: 18/246,306

(22) PCT Filed: Jul. 29, 2022

(86) PCT No.: PCT/IB2022/057058
§ 371 (c)(1),
(2) Date: Mar. 22, 2023

(87) PCT Pub. No.: WO2023/007451
PCT Pub. Date: Feb. 2, 2023

(65) Prior Publication Data
US 2023/0376897 A1     Nov. 23, 2023

(30) Foreign Application Priority Data
Jul. 29, 2021   (IN) ............................. 202121034201

(51) Int. Cl.
| | |
|---|---|
| G06Q 10/087 | (2023.01) |
| G06Q 30/0202 | (2023.01) |
| G06Q 30/0204 | (2023.01) |

(52) U.S. Cl.
CPC ....... G06Q 10/087 (2013.01); G06Q 30/0202 (2013.01); G06Q 30/0205 (2013.01)

(58) Field of Classification Search
CPC ............ G06Q 10/087; G06Q 30/0202; G06Q 30/0205
(Continued)

(56) References Cited

U.S. PATENT DOCUMENTS

| | | | | |
|---|---|---|---|---|
| 10,657,492 B1 * | 5/2020 | Wei | ..................... | G06Q 30/0635 |
| 2015/0154619 A1 * | 6/2015 | Grichnik | ............ | G06Q 30/0202 |
| | | | | 705/7.31 |

(Continued)

OTHER PUBLICATIONS

Abdolazimi, Omid & Esfandarani, Mitra & Shishebori, Davood. (2021). Design of a supply chain network for determining the optimal number of items at the inventory groups based on ABC analysis: a comparison of exact and meta-heuristic methods. Neural Computing and Applications. 33. 1-16. 10.1007/s00521-020-05428-y.

(Continued)

*Primary Examiner* — Garcia Ade
(74) *Attorney, Agent, or Firm* — FINNEGAN, HENDERSON, FARABOW, GARRETT & DUNNER, LLP

(57) ABSTRACT

Present disclosure generally relate to stock re-estimation, particularly relates to methods and systems for re-estimating stock and simulating demand, due to price drop in online/offline wholesale/retail products/appliances. System receives attribute data, business context data, price change data, historical sales data, store related data, inventory data, discount data, input plan data as input. System performs (Continued)

feature engineering on input data to extract data latent variables, calendar features, demographics data, derived variables, web extracted data. System performs operations such as price causal, sales forecast, Price Segment (PS) causal, and output data at DC level and determines delta change, multiplication factor, price segment distribution from output data at site level. System obtains input plan data and determined delta change, multiplication factor, price segment distribution from output data at site level to compute re-order plan and output what if analysis, multi-level forecasting, forecast for extended time, demand sensing, seasonality simulation, ABC classification, reorder plan.

11 Claims, 16 Drawing Sheets

(58) Field of Classification Search
USPC .......................................................... 705/28
See application file for complete search history.

(56) References Cited

U.S. PATENT DOCUMENTS

| | | |
|---|---|---|
| 2020/0364817 A1 | 11/2020 | Park et al. |
| 2021/0216907 A1* | 7/2021 | Husain ................... G06N 20/00 |
| 2021/0357402 A1* | 11/2021 | Cheng .............. G06F 16/24568 |

OTHER PUBLICATIONS

Scholz-Reiter, Bernd & Heger, Jens & Meinecke, Christian & Bergmann, Johann. (2012). Integration of demand forecasts in ABC-XYZ analysis: Practical investigation at an industrial company. International Journal of Productivity and Performance Management. 61. 445-451. 10.1108/17410401211212689.
International Search Report from International Appl. No. PCT/IB2022/057058, mailed Sep. 11, 2022.

* cited by examiner

DEMAND SENSING 362

STATISTICAL FORECASTING (WEEKLY/ MONTHLY)

EXTERNAL SIGNALS (SOCIAL MEDIA, WEATHER, EVENTS ETC)

DEMAND SENSING 362 (OPTIMIZED DAILY FORECASTS)

WHAT IF ANALYSIS 356

PRODUCT MIX

| SD | ARTICLE | W1 | W2 | W3 | W4 | W5 | W6 |
|---|---|---|---|---|---|---|---|
| AABB EVOLVE | AABB EVOLVE BLACK(OC/4/64/5.9) | 0 | 0 | 0 | 0 | 0 | 0 |
| CCDD I AIR 2+ | CCDD ID3K CCDD I AIR 2+ BLACK(QC/2/32/6.2) | 0 | 0 | 0 | 0 | 0 | 0 |
| EEFF G1 | EEFF G1 GREY (QC/2/16/5IN) | 0 | 0 | 0 | 0 | 0 | 0 |
| GGHH P 1 | GGHH P1 GREY (QC/2/16/5IN) | 0 | 0 | 0 | 0 | 0 | 0 |
| IIJJ 3 64 | IIJJ PIXEL 3 BLACK (6/64/QC/5) | 0 | 0 | 0 | 0 | 0 | 0 |
| KKLL VIEW 20 (6GB/128GB) | KKLL VIEW 20 SAPPHIRE BLUE (OC/6/128/6.4) | 0 | 0 | 0 | 0 | 0 | 0 |
| MMNN VIEW 20 (6GB/128GB) | MMNN VIEW 20 SAPPHIRE BLUE (OC/6/128/6.4) | 0 | 0 | 0 | 0 | 0 | 0 |

RE-ORDER MIX

| SD | ARTICLE | W1 | W2 | W3 | W4 | W5 | W6 |
|---|---|---|---|---|---|---|---|
| AABB EVOLVE | AABB EVOLVE BLACK(OC/4/64/5.9) | 0 | 0 | 0 | 0 | 0 | 0 |
| CCDD I AIR 2+ | CCDD ID3K CCDD I AIR 2+ BLACK (QC/2/32/6.2) | 0 | 0 | 0 | 0 | 0 | 0 |
| EEFF G1 | EEFF G1 GREY (QC/2/16/5IN) | 0 | 0 | 0 | 0 | 0 | 0 |
| GGHH P 1 | GGHH P1 GREY (QC/2/16/5IN) | 0 | 0 | 0 | 0 | 0 | 0 |
| IIJJ 3 64 | IIJJ PIXEL 3 BLACK (6/64/OC/5) | 0 | 0 | 0 | 0 | 0 | 0 |
| KKLL VIEW 20 (6GB/128GB) | KKLL VIEW 20 SAPPHIRE BLUE (OC/6/128/6.4) | 0 | 0 | 0 | 0 | 0 | 0 |
| MMNN VIEW 20 (6GB/128GB) | MMNN VIEW 20 SAPPHIRE BLUE (OC/6/128/6.4) | 0 | 0 | 0 | 0 | 0 | 0 |

FIG. 5F

FORECAST FOR EXTENDED TIME 360

DIVIDE THE FORECASTING HORIZON H INTO M BLOCKS EACH LENGTH B $[Y_{T+1}, \ldots, Y_{T+1}] = F_1(Y_{T_1}, \ldots, Y_1, _{N+1}) + \epsilon$ $[Y_{T+B}, \ldots, Y_{T+B+1}] = F_2(Y_{T_1}, \ldots, Y_1, _{N+1}) + \epsilon$ $[Y_{T+3B}, \ldots, Y_{T+3B+1}] = F_3(Y_{T_1}, \ldots, Y_1, _{N+1}) + \epsilon$ $[Y_{T+H}, \ldots, Y_{T+3B+1}] = F_M(Y_{T_1}, \ldots, Y_2, _{N+1}) + \epsilon$

SAMPLE RECURRENT NEURAL NETWORK ARCHITECTURE

INPUT LAYER          HIDDEN LAYER          OUTPUT LAYER

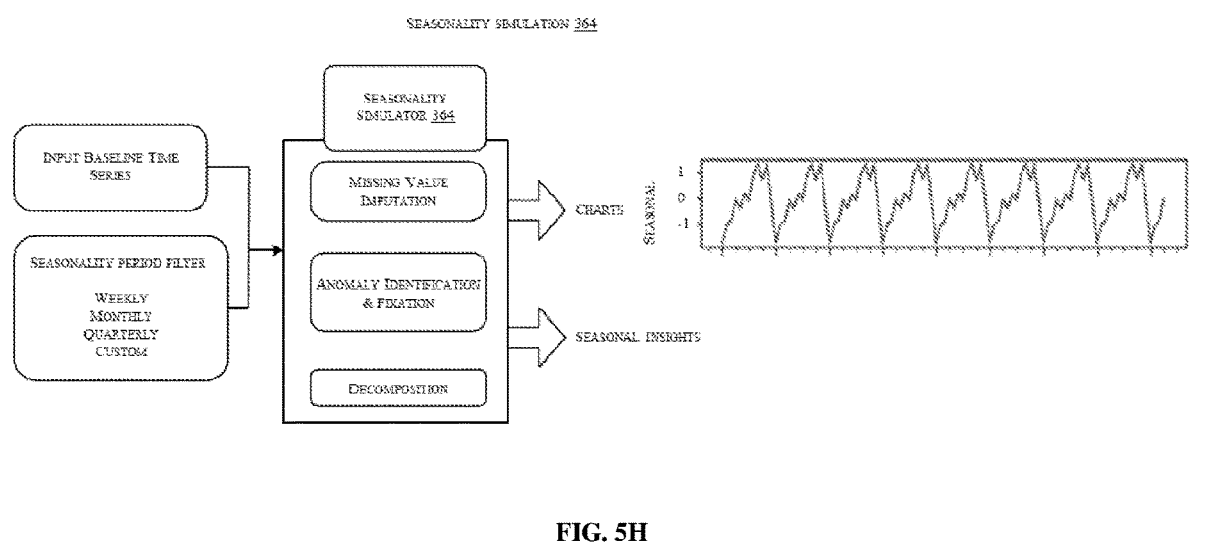

SEASONALITY SIMULATION 364

SEASONALITY SIMULATOR 364

INPUT BASELINE TIME SERIES

SEASONALITY PERIOD FILTER

WEEKLY
MONTHLY
QUARTERLY
CUSTOM

MISSING VALUE IMPUTATION

ANOMALY IDENTIFICATION & FIXATION

DECOMPOSITION

CHARTS

SEASONAL INSIGHTS

FIG. 5H

METHODS AND SYSTEMS FOR RE-ESTIMATING STOCK

FIELD OF INVENTION

The embodiments of the present disclosure generally relate to stock re-estimation. More particularly, the present disclosure relates to methods and systems for re-estimating stock and simulating demand, due to price drop in online/offline wholesale/retail products/appliances.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

In general, efficient stock/inventory control may be a challenge for an organisation that must maintain substantial investments in stock/inventory, such as an online/offline wholesale/retail products/appliances selling/manufacturing firm. Demands may be imposed on a stock/inventory by customers seeking supplies of the products/items. To compete in today's highly competitive markets, the organisation may need to establish a stock/inventory policy that specifies when an order for additional items should be placed, and how many items should be ordered at each order time. This depends on the revenues and costs associated with the stock/inventory situation. Stock/inventory theory may deal with the determination of the best stock/inventory policy.

Conventional methods may involve equations for setting parameter values in specific situations. These equations, however, may be based on restrictive assumptions to make the analysis traceable. Further, the simulation approach may require many more calculations than analytic counterparts. Further, conventional methods may obtain stock/inventory by providing system-wide view of the effect of changes in related decision variables. However, a forecast may be made for the sales quantity of a product in a future time period, and when a brand of the product declares a discount/price drop, then re-estimation of the updated forecast may not be performed by the conventional methods.

There is therefore a need in the art to provide a methods and systems that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide for methods and systems for re-estimating stock and simulating demand, due to price drop in online/offline wholesale/retail products/appliances.

An object of the present disclosure is to provide for a method and a system for forecasting for the sales quantity of a product in a future time period even after declaring a discount/price drop, based on re-estimation of the updated forecast.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides for a system for facilitating re-estimation of stock of a product of an entity. The system may include one or more processors coupled with a memory that may store instructions which when executed by the one or more processors causes the system to: receive, a first set of data packets, from one or more second computing devices associated with the entity, the first set of data packets pertaining to one or more parameters associated with one or more future attributes of the product. The system may further receive a second set of data packets, from the one or more second computing devices associated with the entity, the second set of data packets pertaining to one or more parameters associated with one or more current attributes of the product. The system may then extract, a set of attributes from the first and the second set of data packets received, the set of attributes including one or more latent variables, one or more calendar features, demographics data, one or more derived variables, and web extracted data. The system may then re-estimate, by an artificial intelligence (AI) engine, one or more parameters associated with the stock of the product. Based on the re-estimated one or more parameters, the AI engine may forecast, a re-order plan of the stock of the product.

In an embodiment, the one or more parameters associated with one or more current attributes of the product may include attribute data, business context data, price change data, historical sales data, store related data, inventory data, discount data, and input plan data. Thus, the system provides re-estimating stock and simulating demand, due to price drop in online/offline wholesale/retail products/appliances.

In an embodiment, the re-estimation of the one or more parameters may include one or more operations such as price causal, sales forecast, Price Segment (PS) causal, and determining an output product at one or more distribution centres (DC) associated with the entity.

In an embodiment, the second set of data packets may be combined with the output product at the one or more distribution centres (DCs) to obtain an optimum re-order plan at a site level.

In an embodiment, the processor may further determine a delta change, a multiplication factor, a price segment distribution from the optimum re-order plan at site the level.

In an embodiment, the optimum re-order plan may include a what if analysis, a multi-level forecasting, a forecast for extended time, demand sensing, seasonality simulation, and ABC classification. The system therefore enables forecasting for the sales quantity of a product in a future time period even after declaring a discount/price drop, based on re-estimation of the updated forecast.

In an embodiment, the system may be a System on Chip (SoC). The one or more processors, memory, a storage unit, input/output ports and one or more transceiver ports may be integrated in a single chip.

In an embodiment, the processor may be equipped with an onsite data capture, storage, matching, processing, decision-making and actuation logic modules using Micro-Services Architecture (MSA) that may provide a plurality of micro-services in order to support portability.

In an aspect, the present disclosure provides for a method for facilitating re-estimation of stock of a product of an entity. The method may include the steps of receiving, by one or more processors, a first set of data packets, from one or more second computing devices associated with the entity, the first set of data packets pertaining to one or more parameters associated with one or more future attributes of the product. The method may further include the step of receiving, by the one or more processors a second set of data packets, from the one or more second computing devices associated with the entity, the second set of data packets pertaining to one or more parameters associated with one or more current attributes of the product. Further, the method may include the step of extracting, by the one or more processors, a set of attributes from the first and the second set of data packets received, the set of attributes comprising or more latent variables, one or more calendar features, demographics data, one or more derived variables, and web extracted data and then re-estimating, by an artificial intelligence (AI) engine, one or more parameters associated with the stock of the product. Based on the re-estimated one or more parameters, the method may include the step of forecasting, by the AI engine, a re-order plan of the stock of the product.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIGS. 5E and 5F illustrate exemplary table representations of "What if analysis" as an output form the AI engine, in accordance with an embodiment of the present disclosure.

FIGS. 5H and 5I illustrate exemplary block diagram and graph representations, respectively, of seasonality simulator for seasonality simulation as an output from AI engine, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present disclosure provides a robust and effective solution to re-estimating stock and simulating demand, due to price drop in online/offline wholesale/retail products/appliances. The present disclosure enables forecasting for the sales quantity of a product in a future time period even after declaring a discount/price drop, by re-estimation of the updated forecast. The present disclosure may perform operations such as price causal, sales forecast, Price Segment (PS) causal, and output data at DC level. The present disclosure may determine delta change, multiplication factor, price segment distribution from the output data at site level. The present disclosure may output, but not limited to, what if analysis, multi-level forecasting, forecast for extended time, demand sensing, seasonality simulation, ABC classification, reorder plan.

Figure 1:
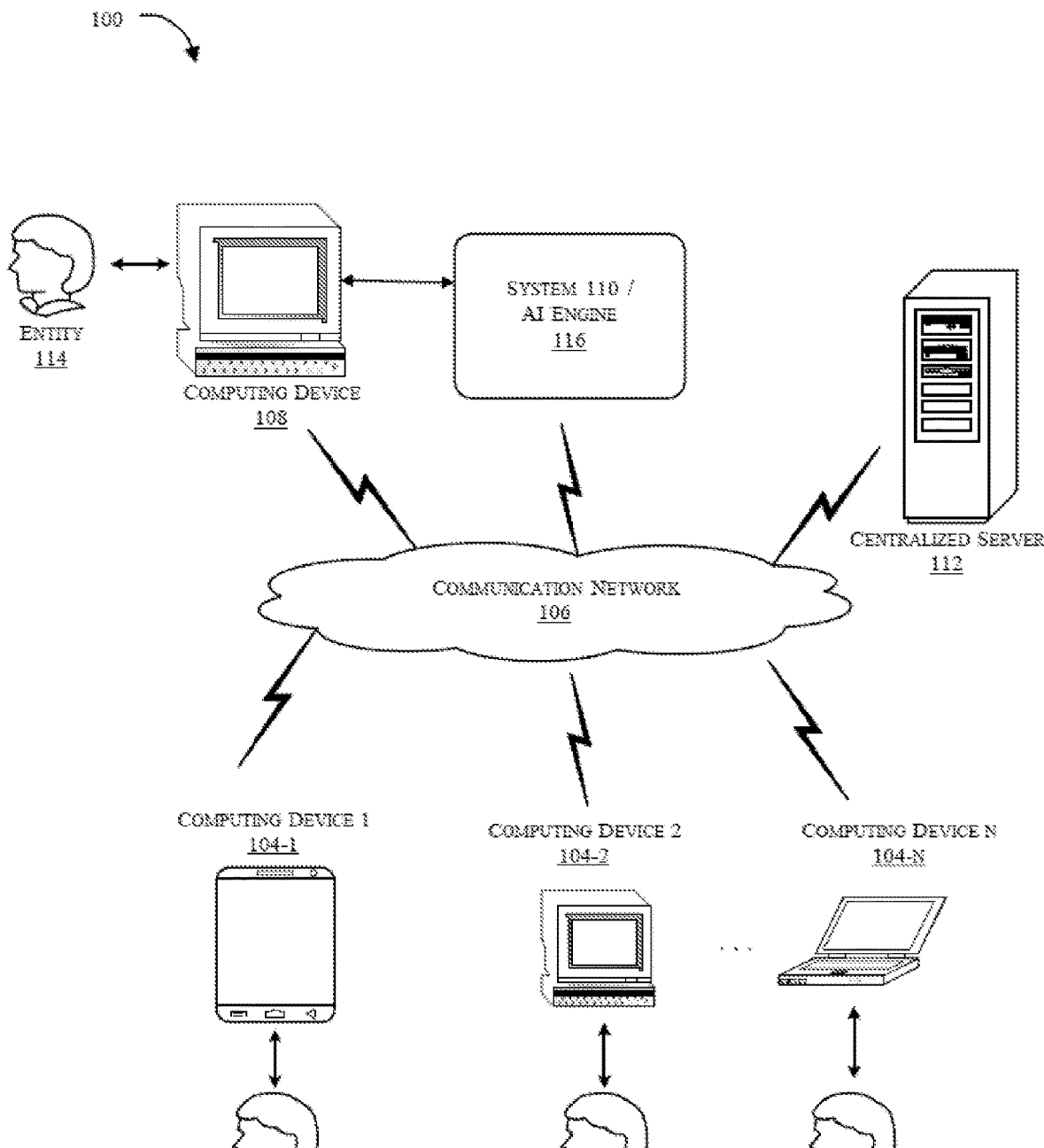
FIG. 1 illustrates an exemplary network architecture in which or with which proposed system of the present disclosure can be implemented, in accordance with an embodiment of the present disclosure.

Referring to FIG. 1 that illustrates an exemplary network architecture for a stock re-estimating system (100) (also referred to as architecture (100)) in which or with which a system (110) or simply referred to as the system (110) of the present disclosure can be implemented, in accordance with an embodiment of the present disclosure. As illustrated, the exemplary architecture (100) may be equipped with an Artificial Intelligence (AI) engine (116) for facilitating stock of products to users (102-1, 102-2, 102-3 . . . 102-N) (individually referred to as the user (102) and collectively referred to as the users (102)) associated with one or more first computing devices (104-1, 104-2 . . . 104-N) (individually referred to as the first computing device (104) and collectively referred to as the first computing devices (104)). The system (110) may be further operatively coupled to a second computing device (108) associated with an entity (114). The entity (114) may include a company, an organisation, a university, a lab facility, a business enterprise, a defence facility, or any other secured facility. In some implementations, the system (110) and the AI engine (116) may also be associated with the second computing device (108). Further, the system (110) may also be communicatively coupled to the one or more first computing devices (104) via a communication network (106).

The system (110) may be coupled to a centralized server (112). The centralized server (112) may also be operatively coupled to the one or more first computing devices (104) and the second computing devices (108) through the communication network (106). In some implementations, the system (110) and the AI engine (116) may also be associated with the centralized server (112).

In an embodiment, the system (110) may receive a first set of data packets from the one or more second computing devices (108) associated with the entity (114). The first set of data packets pertaining to one or more parameters associated with one or more future attributes of the product. For example, the one or more future attributes may pertain to a sales quantity of the product in a future time period. The system (110) may further receive a second set of data packets, from the one or more second computing devices associated with the entity. The second set of data packets pertaining to one or more parameters associated with one or more current attributes of the product. The one or more current attributes of the product may include, but not limited to, attribute data, business context data, price change data, historical sales data, store related data, inventory data, discount data, input plan data, and the like.

In an embodiment, the system (110) may perform feature engineering on the first and second set of data packets to extract a set of attributes, but not limited to, latent variables, calendar features, demographics data, derived variables, web extracted data, and the like. The system (110) may be further operatively coupled to one or more distribution centres. A distribution centre is a product storage and shipping building that stores goods an entity or company produces. Distribution centres are a key part of the distribution chain for products, order fulfilment, and storing produced goods prior to their shipment to wholesale, retail or customers. The system (110) may perform operations such as price causal, sales forecast, Price Segment (PS) causal, and an output product data at one or more distribution centres (DC).

The system (110) may further be coupled to a predefined site. For example, a site can be any and all Internet websites and mobile applications owned, maintained, or operated by or for the entity that are used in, held for use in, necessary for or related to the conduct or operation of the product sales, estimation marketing and the like. In an embodiment, the system (110) may receive the first and the second set of data packets (also referred herein as input data) associated with the output data at DC level and input data to decompose the output product data at the DC level and the input product data for outputting the data at a predefined site level.

In an embodiment, the system (110) may determine delta change, multiplication factor, price segment distribution from the output data at the predefined site level.

In an embodiment, the system (110) may obtain an input plan data and the determined delta change, multiplication factor, price segment distribution from the output data at the predefined site level to compute re-order plan.

In an embodiment, the system may output, but not limited to, a what if analysis, a multi-level forecasting, a forecast for extended time, a demand sensing, seasonality simulation, an ABC classification, a reorder plan. The ABC classification may be a ranking technique for identifying and grouping items in terms of how useful they are for achieving business goals.

In an embodiment, the system (110) may be a System on Chip (SoC) system but not limited to the like. In another embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the system (110) as proximate processing may be acquired towards re-estimating of stock. The system (110) configuration details can be modified on the fly.

In an embodiment, the system (110) may be remotely monitored and the data, application and physical security of the system (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, the communication network (106) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (104), the one or more second computing devices (108) may communicate with the system (110) via set of executable instructions residing on any operating system, including but not limited to, Android™, iOS™, Kai OS™, and the like. In an embodiment, to one or more first computing devices (104), and the one or more second computing devices (108) may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the one or more second computing devices (108) may not be restricted to the mentioned devices and various other devices may be used. A smart computing device may be one of the appropriate systems for storing data and other private/sensitive information.

Figure 2:
FIG. 2 illustrates an exemplary representation of proposed system for re-estimating stock, in accordance with an embodiment of the present disclosure.
Figure 2:
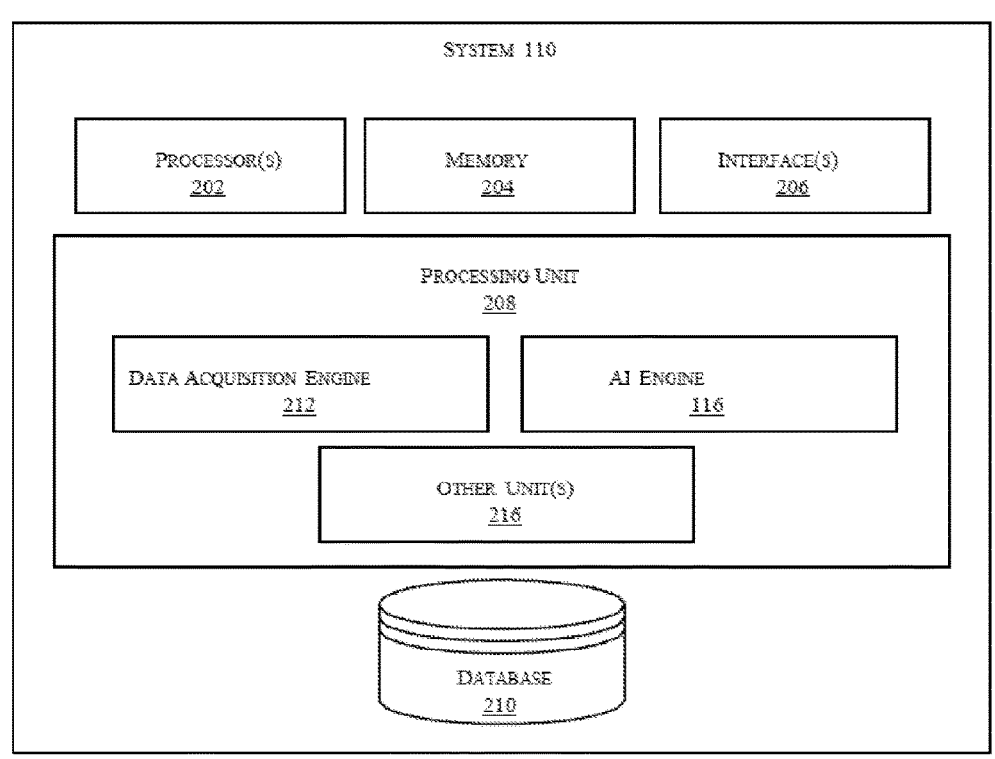

FIG. 2 with reference to FIG. 1, illustrates an exemplary representation of system (110) for facilitating stock re-estimation, in accordance with an embodiment of the present disclosure. In an aspect, the system (110) may comprise one or more processor(s) (202). The one or more processor(s) (202) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) (206) may comprise a variety of interfaces, for example, interfaces for data input and output devices, referred to as I/O devices, storage devices, and the like. The interface(s) (206) may facilitate communication of the system (110). The interface(s) (206) may also provide a communication pathway for one or more components of the system (110). Examples of such components include, but are not limited to, processing unit/engine(s) (208) and a database (210).

The processing unit/engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry The processing engine (208) may include one or more engines selected from any of a data acquisition engine (212), AI engine (116), and other engines (216). The processing engine (208) may further be an edge based micro service event processing but not limited to the like.

In an embodiment, the data acquisition engine may receive a set of data set associated with one or more future attributes of a product and one or more parameters associated with one or more current attributes of the product from the one or more second computing devices (108) associated with the entity (114). For example, the one or more future attributes may pertain to a sales quantity of the product in a future time period. The one or more current attributes of the product may include, but not limited to, attribute data, business context data, price change data, historical sales data, store related data, inventory data, discount data, input plan data, and the like.

In an embodiment, the AI engine (214) may perform feature engineering on the one or more parameters associated with one or more future attributes of the product and the one or more parameters associated with one or more current attributes of the product to extract a set of attributes, but not limited to, latent variables, calendar features, demographics data, derived variables, web extracted data, and the like. The AI engine (214) may perform operations such as price causal, sales forecast, Price Segment (PS) causal, and an output data at one or more distribution centres (DC).

In an embodiment, the AI engine (214) may further determine delta change, multiplication factor, price segment distribution from the output data at the predefined site level and may obtain an input plan data and the determined delta change, multiplication factor, price segment distribution from the output data at the predefined site level to compute re-order plan.

In an embodiment, the AI engine (214) may perform a set of operations such as a what if analysis, a multi-level forecasting, a forecast for extended time, a demand sensing, seasonality simulation, an ABC classification, a reorder plan and the like.

Figure 3A:
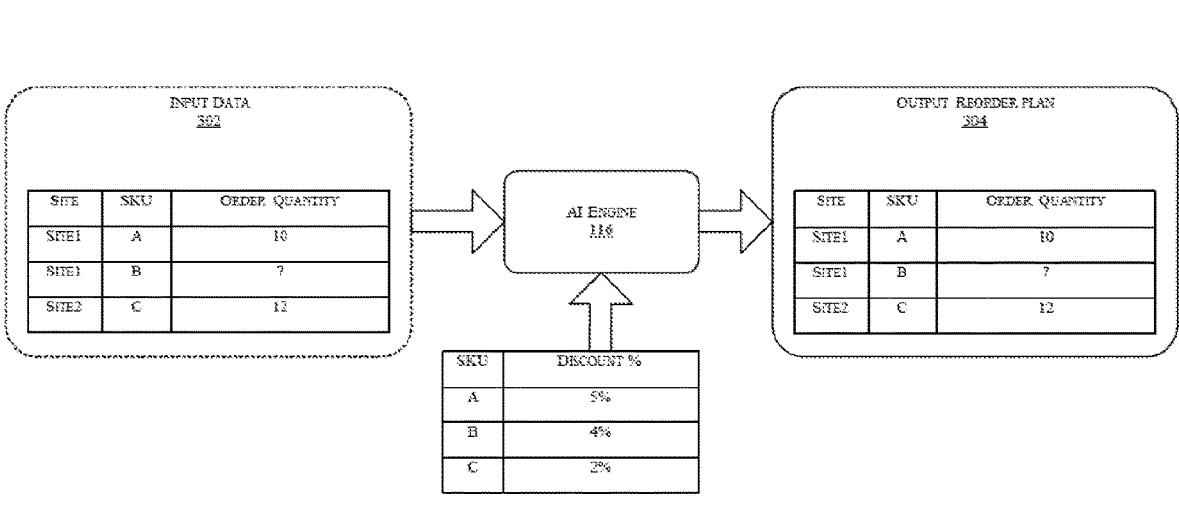
FIGS. 3A and 3B illustrate exemplary block diagram representations of an AI engine, in accordance with an embodiment of the present disclosure.
Figure 3B:
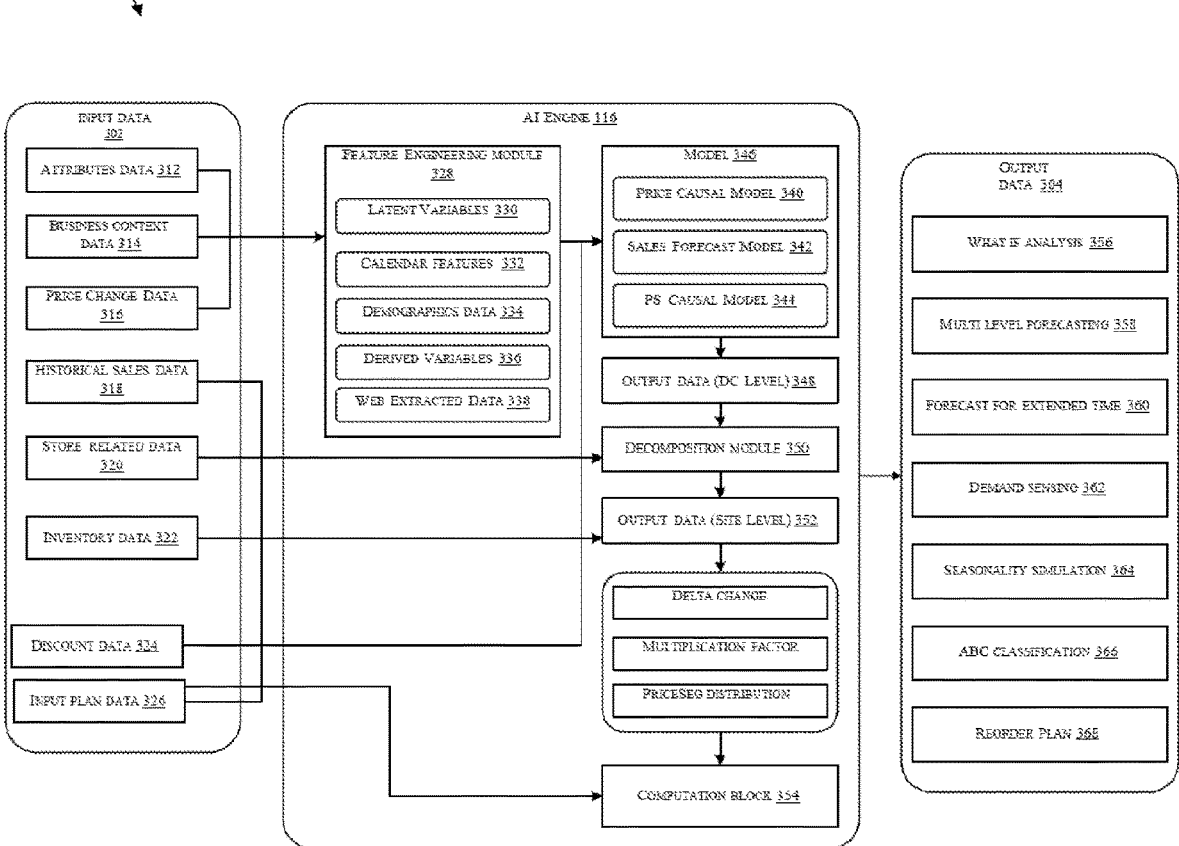

FIGS. 3A and 3B illustrate exemplary block diagram representations of an AI engine (116), in accordance with an embodiment of the present disclosure As illustrated in FIG. 3A, the AI engine (116) may receive an input data (302) and output re-order plan data (304). For instance, the input data (302) to the AI engine (116) may be an order quantity from Stock-Keeping Unit (SKU) related to website 1, website 2. For example, the SKU may provide order quantity (sales A) as 10 for site 1, 7 for site 1 (sales B), and 12 for site 2 (sales C). The AI engine (116) may process the input data and obtain discount percentage for each SKU A, B, C. For example, the SKU A may be 5%, SKU b 4% and SKU C may be 2%. The AI engine (116) may output as forecast order quantity for site 1, SKU A is 13, order quantity for site 1 and SKU B is 8, and order quantity for site 2 and SKU C is 13.

As illustrated in FIG. 3B, the AI engine (116) may include receive the input data (302) and output the re-order plan data (304). The input data (302) may include, but not limited to, attribute data (312), business context data (314), price change data (316), historical sales data (318), store related data (320), inventory data (322), discount data (324), input plan data (326), and the like. The AI engine (116) may include a feature engineering module (328), and a model (346). The feature engineering module (328) may perform feature engineering, but not limited to, a latent variables (330), calendar features (332), demographic data (334), derived variables (336), web extracted data (338). Further, the model (346) may include, but not limited to, a price causal model (340), a sales forecast model (342), and a Price Segment (PS) model (344). The model (346) may output data at DC level (348). Further, the AI engine (116) may include decomposition module (330), which may take historical sales data (318), store related data (320), input plan data (326) and the output data at DC level (348), to provide output data at site level (352). The AI engine (116) may extract delta change, multiplication factor Price Segment (PS) distribution to provide to a computation block (354), which also acquires input plan data (326).

The AI engine (116) may output data (304), but not limited to, "what If analysis (356), multi-level forecasting (358), forecast for extended time (360), demand sensing (362), seasonality simulation (364), ABC classification (366), re-order plan (368), and the like.

Figure 4A:
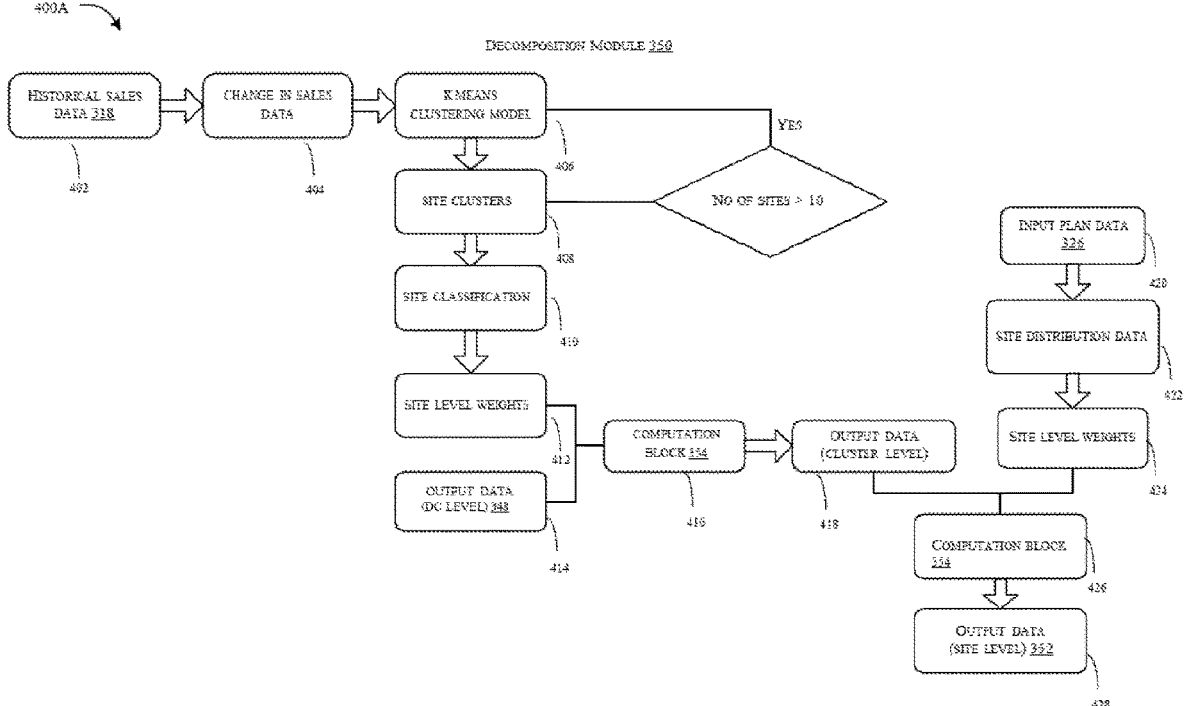
FIG. 4A illustrates an exemplary flow diagram representation of decomposition of data using decomposition module of the AI engine, in accordance with an embodiment of the present disclosure.

An embodiment of the method (400A) performed by the decomposition module (350) of the AI engine (116) is depicted in FIG. 4A. At (402) and (404), the decomposition module (350) may receive input of historical sales data (318), and change in sales data, respectively. At step (406), the decomposition module (350) may perform K means clustering of the historical sales data (318), and change in sales data, using the K means clustering model. At step (408), the decomposition module (350) may cluster the sites. At step (410), the decomposition module (350) may classify the clustered sites. At step (412), the decomposition module (350) may provide site level weights. At step (414), the decomposition module (350) may output data at DC level (348) to the computation block (354). At step (418), the computation block (354) may output data at cluster level. At step (420), (422), and (424), the input pan data (326), site distribution data and site level weights, respectively are inputted to the computation block (354). At step (426) the computation block (354) may receive the input pan data (426), site distribution data and site level weights. At step (428), the computation block (354) may output data at site level (352).

Figure 4B:
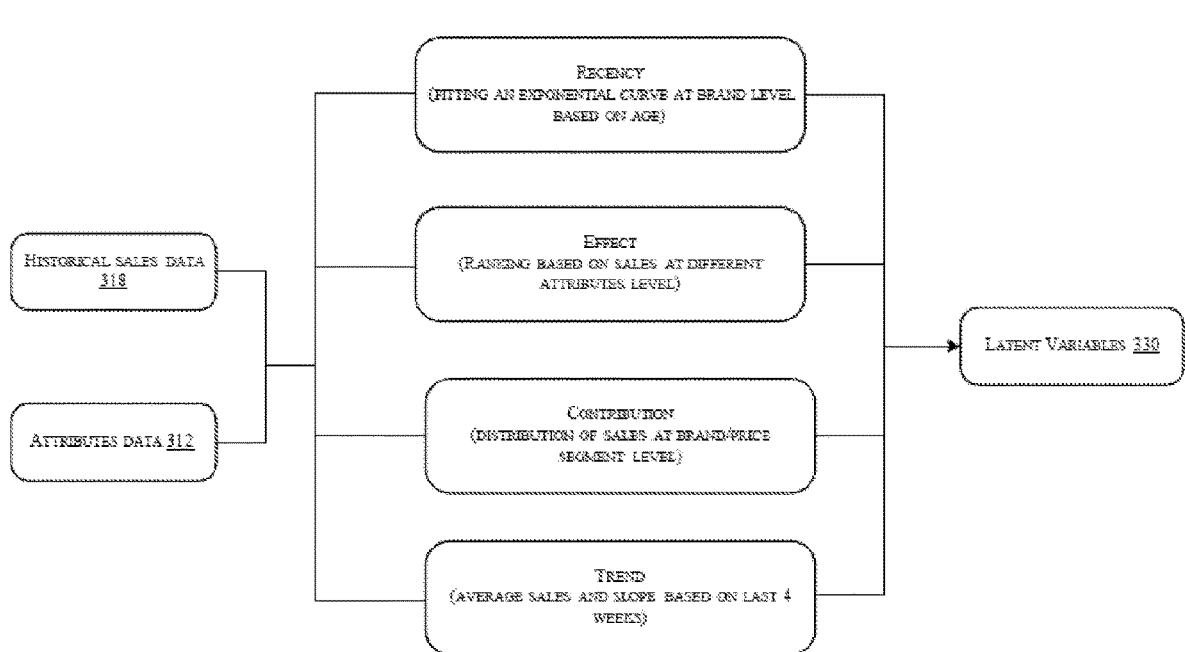
FIG. 4B illustrates an exemplary flow diagram representation of latent variables using a feature engineering module of the AI engine, in accordance with an embodiment of the present disclosure.

Further, the feature engineering module (328) may output latent variables (330) as shown in FIG. 4B. The historic sales data (318), attributes data (312) may be inputted to the feature engineering module (328). The feature engineering module (328) may perform recency, effect, contribution and trend of the historic sales data (318), and of the attributes data (312). The recency may include fitting an exponential curve at brand level based on age. Further, the effect may include ranking based on sales at different attributes level. Furthermore, the contribution may include distribution of sales at brand/price segment level. Thereafter, the trend may include average sales and slope based on last 4 weeks. Finally, the feature engineering module (328) may output latent variables (330), using the recency, effect, contribution and trend of the historic sales data (318), attributes data (312).

Figure 5A:
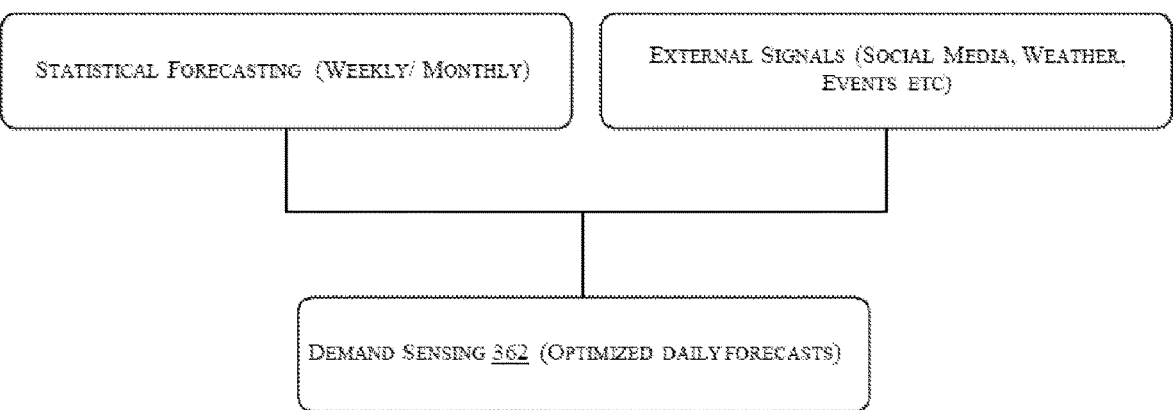
FIG. 5A illustrates an exemplary block diagram representation of composition of demand sensing as an output form the AI engine, in accordance with an embodiment of the present disclosure.
Figure 5B:
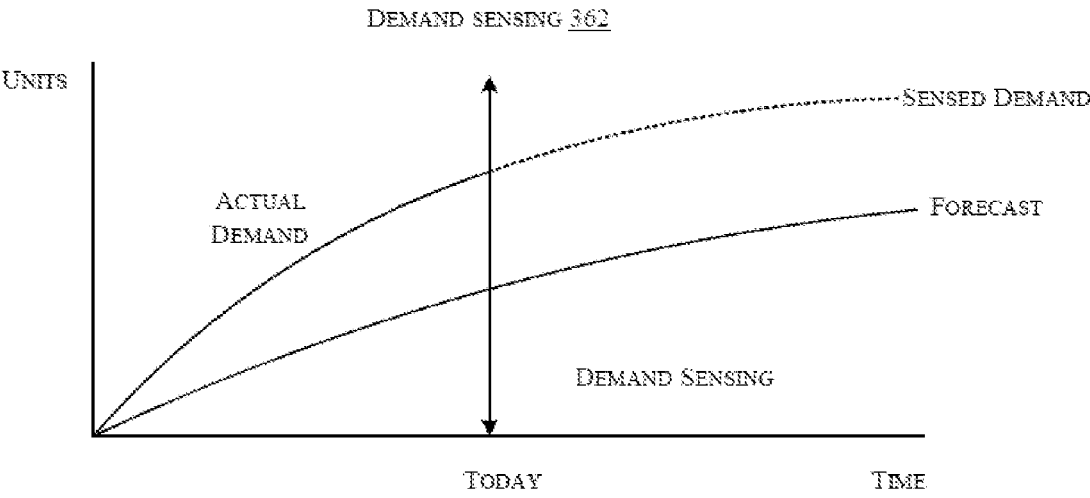
FIG. 5B illustrates an exemplary graph representation of composition of demand sensing as an output form the AI engine, in accordance with an embodiment of the present disclosure.

Further, one of the output data (304) of the AI engine (116) may be demand sensing (362) as shown in FIG. 5A. FIG. 5A illustrates an exemplary block diagram representation of composition of demand sensing (362) as an output form the AI engine (116), in accordance with an embodiment of the present disclosure. The demand sensing (362) may include statistical forecasting (weekly/monthly) and external signals (social media, weather, events and so on) to provide demand sensing (362) of optimized daily forecasts. The graph of demand sensing (362) may be depicted in FIG. 5B. The graphs includes units in y axis and time in x axis. The graph depicts the actual demand and sensed demand for example, today.

Figure 5C:
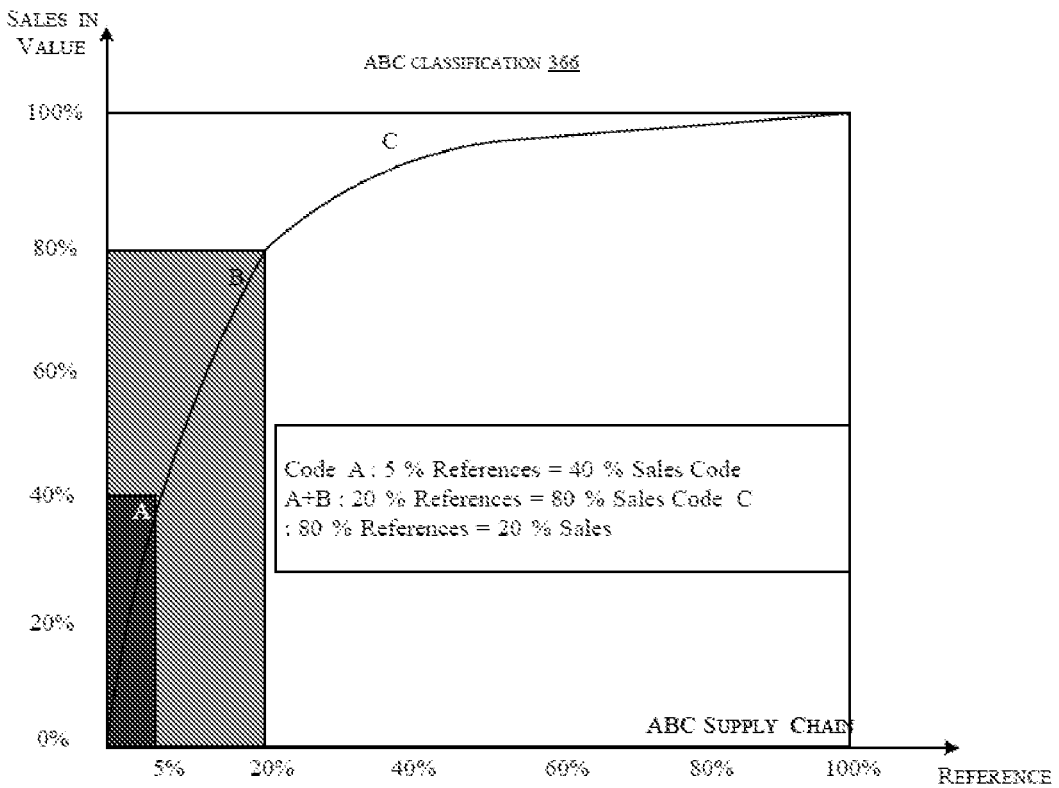
FIG. 5C illustrates an exemplary graph representation of ABC sales classification as an output form the AI engine, in accordance with an embodiment of the present disclosure.
Figure 5D:
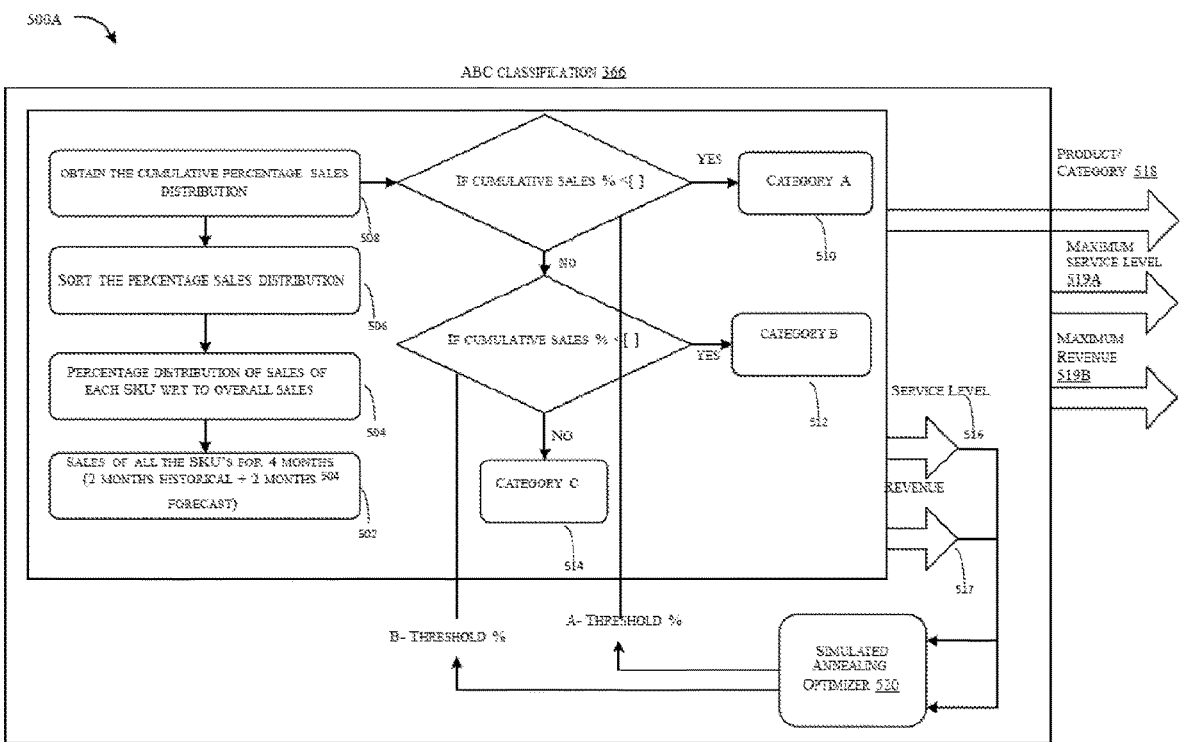
FIG. 5D illustrates an exemplary flow chart representation of ABC sales classification as an output form the AI engine, in accordance with an embodiment of the present disclosure.

Further, another output data (304) of the Ai engine (116) may be ADC classification (366) as shown in FIGS. 5C and 5D. FIG. 5C is a graph representation of ABC sales classification as an output from the AI engine (116). The graph on x axis depicts references, and y axis depicts sales in value. For instance, the ABC classification (366) may be a ranking technique for identifying and grouping items in terms of how useful they are for achieving business goals. In an embodiment, the ABC classification (366) may require grouping items into three categories such as "A" which is extremely important, "B" which is moderately important and "C" which is relatively important. Further, FIG. 5D illustrates an exemplary flow chart representation of ABC sales classification method (500A) as an output form the AI engine (116).

At step (502), the AI engine (116) may determine sales of all the SKU's for 4 months (2 months historical+2 month's forecast). At step (504), the AI engine (116) may determine percentage distribution of sales of each SKU with respect to overall sales. At step (506), the AI engine (116) may sort the percentage sales distribution. At step (508), the AI engine (116) may obtain the cumulative percentage sales distribution. If the cumulative percentage sales distribution is less than "A" threshold, then at step (510), the AI engine (116) may output category "A". If not less than "A" threshold, then the AI engine (116) may check if, the cumulative percentage sales distribution is less than "B" threshold. If, the cumulative percentage sales distribution is less than "B" threshold, then at step (512), the AI engine (116) may output category "B", if not at step (514), the AI engine (116) may output category "C". The "A" and "B" threshold may be provided to the AI engine (116), by the simulated annealing optimizer (520). At step (516), (517), (518), (519A), and (519B) may be service level, revenue, product/category, maximum service level and maximum revenue, respectively.

Figure 5E:
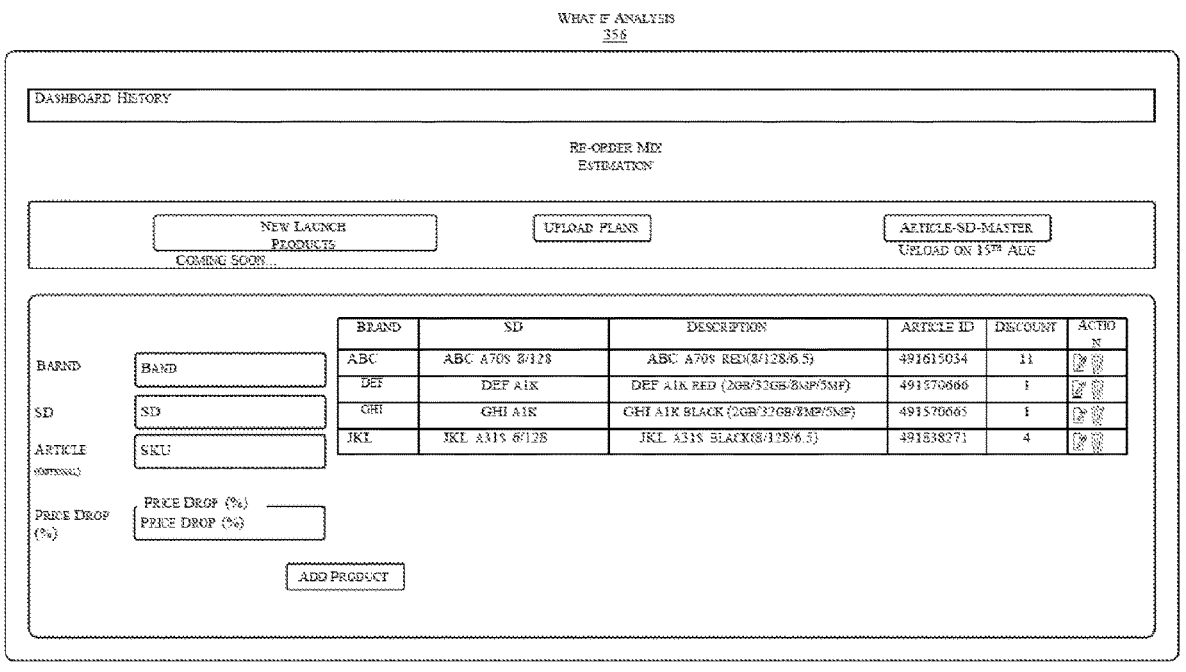

Further, another output data (304) of the AI engine (116) may be "what if analysis" (356) as shown in table of FIGS. 5E and 5F. A depicted in table of FIG. 5E, for example, the AI engine (116) may receive input as brand, model description, description, article Identity (ID), and the discount percentage to provide re-order mix estimation according to the date of the date of the discount. Further, FIG. 5F depicts the product mix and reorder mix for what if analysis (356).

Figure 5G:
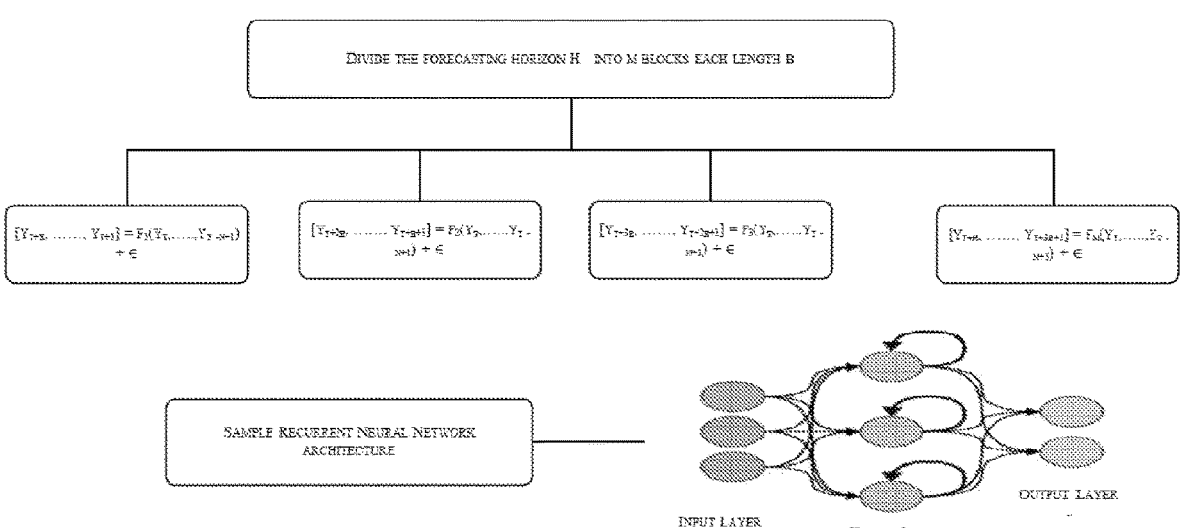
FIG. 5G illustrates an exemplary block diagram representation of forecast for extended time as an output from AI engine, in accordance with an embodiment of the present disclosure.

Furthermore, another output data (304) of the AI engine (116) may be forecast for extended time as shown in FIG. 5G. The AI engine (116) may include sample Recurrent Neural Network (RNN) architecture such as a Direct Deep Recurrent Neural Network MIMO (DIRDRNNMO) strategy may be used for forecast of extended time which may be according to equation 1 below:

$$[y_{t+H}, \ldots, y_{t+1}] = f(y_t, \ldots, y_{t-n+1}) \qquad \text{Equation 1}$$

In the above equation 1, the term h$\epsilon\{1, \ldots H$, the term "n" may be autoregressive order of the model, the term "$y_t$" may be the value of the time series at time point "t".

The general idea is to split the forecasting horizon "H" into "m=H/b" blocks of length b where b$\epsilon\{1, \ldots H\}$. Then training "m" different models where each model may be used to predict one of the blocks in Multiple Input Multiple Output (MIMO) fashion. Thereafter, this problem is solved as a sequence-sequence problem using recurrent neural network DIRDRNNMO. The RNN such as the DIRDRNNMO architecture may divide the forecasting horizon "H" into "m" blocks each length "b". The division is shown in below equations 2-5 below:

$$[y_{t+b}, \ldots, y_{t+1}] = f_1(y_t, \ldots, y_{t-n+1}) + \epsilon \qquad \text{Equation 2}$$

$$[y_{t+2b}, \ldots, y_{t+b+1}] = f_2(y_t, \ldots, y_{t-n+1}) + \epsilon \qquad \text{Equation 3}$$

$$[y_{t+3b}, \ldots, y_{t+2b+1}] = f_3(y_t, \ldots, y_{t-n+1}) + \epsilon \qquad \text{Equation 4}$$

$$[y_{t+h}, \ldots, y_{t+3b+1}] = f_m(y_t, \ldots, y_{t-n+1}) + \epsilon \qquad \text{Equation 5}$$

In the above equation 2-5, the term "$y_t$" may refer to the value of the time series at time point "t".

In the FIG. 5G, each model block may be a sequence-to-sequence recurrent neural network model.

Figure 5I:
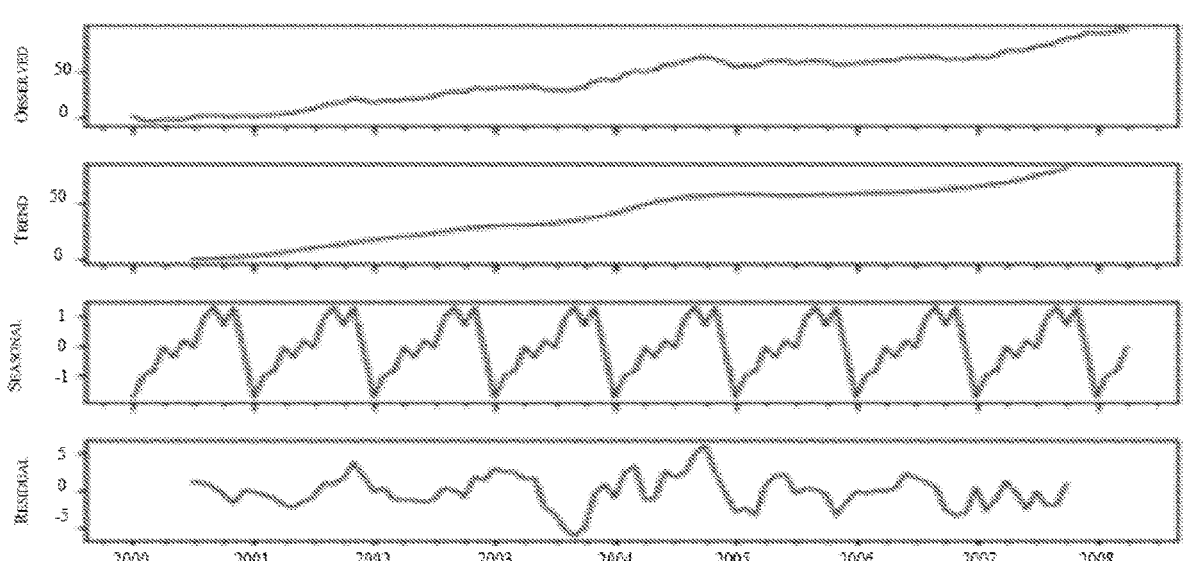

Thereafter, another output data (304) of the AI engine (116) may be seasonality simulation (364) as shown in FIG. 5H. The seasonality simulator (364) may receive input of baseline time series, seasonality period filter (such as weekly, monthly, quarterly, custom). Further, the seasonality simulator (364) may perform missing value imputation, anomaly identification and fixation, decomposition. The seasonality simulator (364) may output charts as shown in FIG. 5I, and also seasonal insights.

Figure 5J:
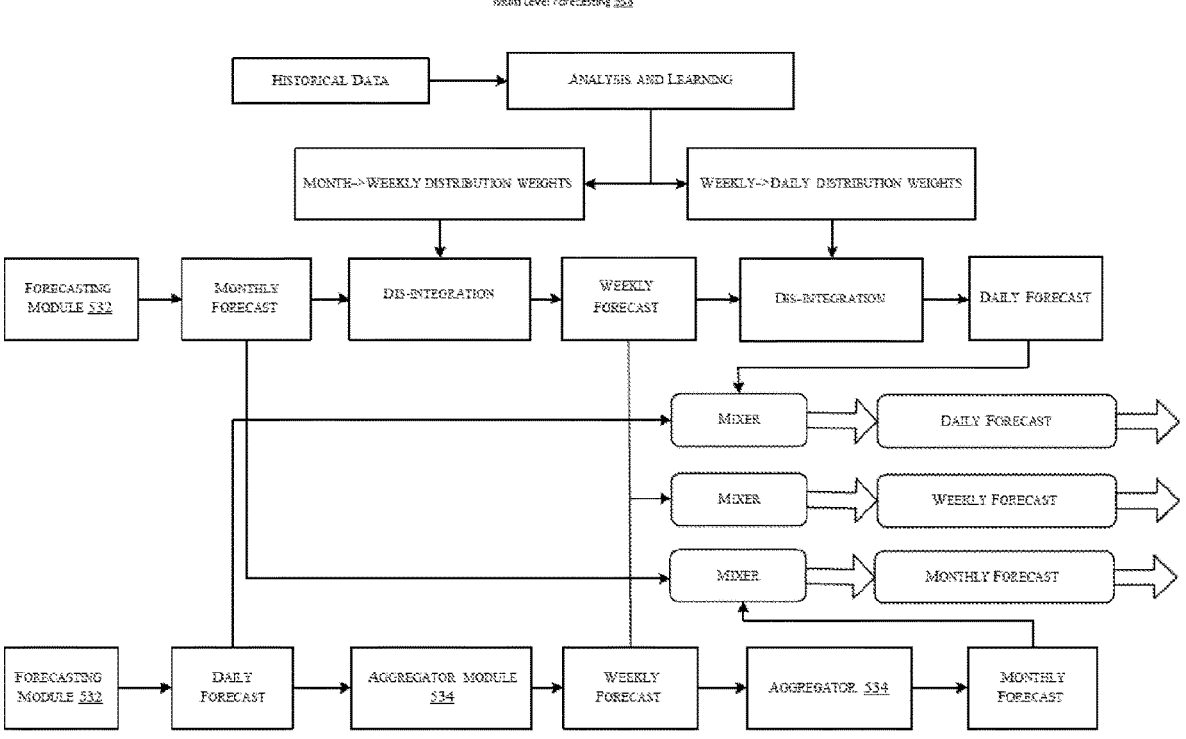
FIG. 5J illustrates an exemplary flow diagram representation of multi-level forecasting as an output of AI engine, respectively, in accordance with an embodiment of the present disclosure.

Also, another output data (304) of the AI engine (116) may be multi-level forecasting (358), as shown in FIG. 5J. The AI engine (116) may include forecasting module (532) and aggregator module (534). The AI engine (116) may receive historical data for analysis and learning and distribute weights such as monthly to weekly and weekly to daily. The monthly to weekly distribution weights and weekly to daily distribution weights may be disintegrated into monthly forecast, weekly forecast and daily forecast by the forecasting module (532). The daily forecast from the forecasting module (532) may be aggregated by aggregator module (534), into weekly forecast and then to the monthly forecast. The daily forecast from the forecasting module (532) may be mixed and the AI engine (116) may output the final daily forecast. Further, the AI engine (116) may mix the final weekly forecast from the dis-integrated weekly forecast from forecasting module (532) and aggregated weekly forecast from the aggregator module (534), to output final weekly forecast. Furthermore, the AI engine (116) may mix the final monthly forecast from the dis-integrated monthly forecast from forecasting module (532) and aggregated monthly forecast from the aggregator module (534), to output final monthly forecast.

Figure 6:
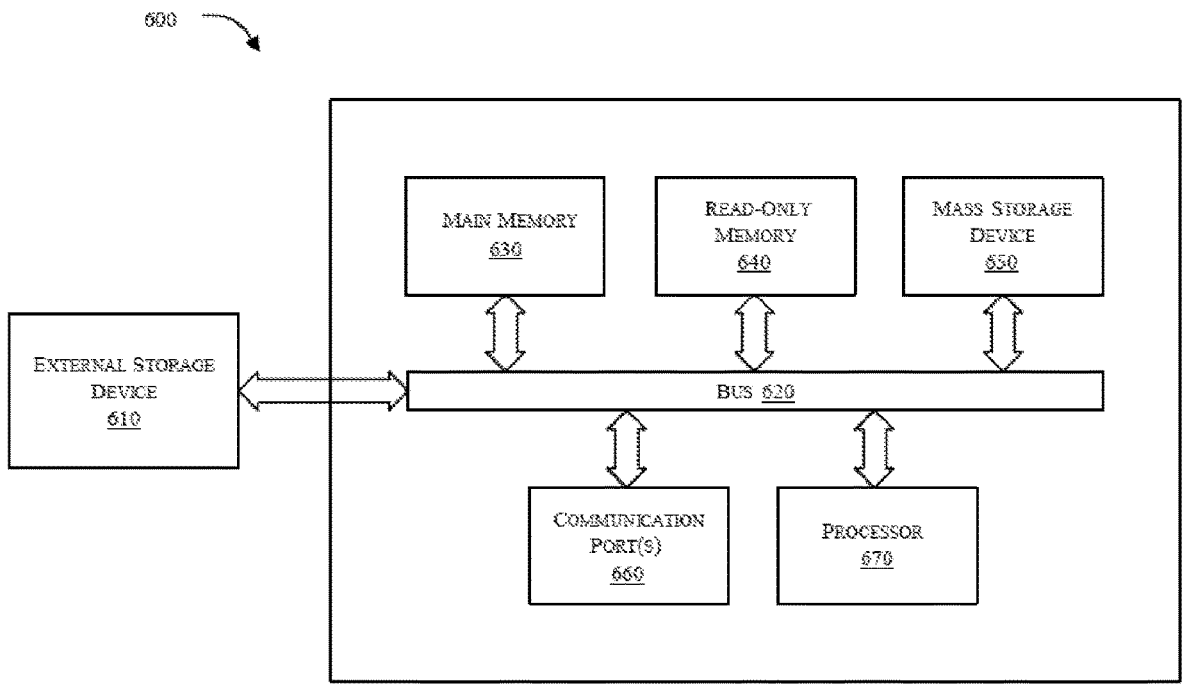
FIG. 6 illustrates an exemplary computer system in which or with which embodiments of the present invention can be utilized, in accordance with embodiments of the present disclosure.

FIG. 6 illustrates an exemplary computer system in which or with which embodiments of the present invention can be utilized in accordance with embodiments of the present disclosure. As shown in FIG. 6, computer system 600 can include an external storage device 610, a bus 620, a main memory 630, a read only memory 640, a mass storage device 650, communication port 660, and a processor 670. A person skilled in the art will appreciate that the computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 670 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects. Memory 630 can be Random Access Memory (RAM), or any other dynamic storage device commonly known in the art. Read-only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with a computer system. Other operator and administrative interfaces can be provided through network connections connected through communication port 660. The external storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides methods and systems for re-estimating stock and simulating demand, due to price drop in online/offline wholesale/retail products/appliances.

The present disclosure provides a robust and effective solution to re-estimating stock and simulating demand, due to price drop in online/offline wholesale/retail products/ appliances.

13

The present disclosure enables forecasting for the sales quantity of a product in a future time period even after declaring a discount/price drop, based on re-estimation of the updated forecast.

The present disclosure may perform operations such as price causal, sales forecast, Price Segment (PS) causal, and output data at DC level.

The present disclosure may determine delta change, multiplication factor, price segment distribution from the output data at site level.

The present disclosure may output, but not limited to, what if analysis, multi-level forecasting, forecast for extended time, demand sensing, seasonality simulation, ABC classification, reorder plan.

We claim:

1. A system for facilitating re-estimation of stock of a product of an entity, the system comprising: one or more processors coupled with a memory, wherein said memory stores instructions which when executed by the one or more processors cause the system to: receive, by the one or more processors, a first set of data packets, from one or more second computing devices associated with the entity, the first set of data packets pertaining to one or more parameters associated with one or more future attributes of the product; receive, by the one or more processors, a second set of data packets, from one or more second computing devices associated with the entity, the second set of data packets pertaining to one or more parameters associated with one or more current attributes of the product; extract, by the one or more processors, a set of attributes from the first and the second set of data packets received, the set of attributes comprising one or more latent variables, one or more calendar features, demographics data, one or more derived variables, and web extracted data; re-estimate, by an artificial intelligence engine operatively coupled to the one or more processors, one or more parameters associated with the stock of the product, wherein said re-estimation comprises performing a price causal analysis, a price segment causal analysis, and determining output product data at one or more distribution centres associated with the entity, wherein the second set of data packets is combined with the product output level at the one or more distribution centres to obtain an optimum re-order plan at a site level; and based on the re-estimated one or more parameters, forecast, by the AI engine a re-order plan of the stock of the product to facilitate replenishment of the stock of the product for a future time period after declaration of a discount or price drop.

2. The system as claimed in claim 1, wherein the one or more parameters associated with one or more current attributes of the product includes attribute data, business context data, price change data, historical sales data, store related data, inventory data, discount data, and input plan data of the product.

3. The system as claimed in claim 1, wherein the processor determines a delta change, a multiplication factor, a price segment distribution from the optimum re-order plan at the site level.

4. The system as claimed in claim 1, wherein the optimum re-order plan comprises a what if analysis, a multi-level forecasting, a forecast for extended time, demand sensing, seasonality simulation, and ABC classification.

5. The system as claimed in claim 1, wherein the system is a System on Chip, wherein the one or more processors, the memory, a storage unit, one or more input/output ports and one or more transceiver ports are integrated in a single chip.

6. The system as claimed in claim 1, wherein the processor is equipped with an onsite data capture, storage, matching, processing, decision-making and actuation logicmodules using Micro-Services Architecture, wherein the MSA provides a plurality of microservices in order to support portability.

7. A method for facilitating re-estimation of stock of a product of an entity, the method comprising: receiving, by one or more processors, a first set of data packets, from one or more second computing devices associated with the entity, the first set of data packets pertaining to one or more parameters associated with one or more future attributes of the product; receiving, by the one or more processors a second set of data packets, from one or more second computing devices associated with the entity, the second set of data packets pertaining to one or more parameters associated with one or more current attributes of the product; extracting, by the one or more processors, a set of attributes from the first and the second set of data packets received, the set of attributes comprising latent variables, calendar features, demographics data, derived variables, and web extracted data; re-estimating, by an artificial intelligence engine, one or more parameters associated with the stock of the product, wherein the AI engine is operatively coupled to the one or more processors, wherein the re-estimation of the one or more parameters includes operations such as price causal, sales forecast, Price Segment causal, and determining a product output level at one or more distribution centres associated with the entity, wherein the second set of data packets is combined with the distribution centre level to obtain an optimum re-order plan at a predefined site level; and based on the re-estimated one or more parameters, forecast, by the AI engine, a re-order plan of the stock of the product to facilitate replenishment of the stock of the product for a future time period after declaration of a discount or price drop.

8. The method as claimed in claim 7, wherein the one or more parameters associated with one or more current attributes of the product includes attribute data, business context data, price change data, historical sales data, store related data, inventory data, discount data, and input plan data of the product.

9. The method as claimed in claim 7, wherein the method determines a delta change, a multiplication factor, a price segment distribution from the optimum re-order plan at the predefined site the level.

10. The method as claimed in claim 7, wherein the optimum re-order plan includes a what if analysis, a multi-level forecasting, a forecast for extended time, demand sensing, seasonality simulation, and ABC classification.

11. The method as claimed in claim 7, wherein the method further comprises steps of an onsite data capturing, storing, matching, processing, decision-making and actuating logic modules using Micro-Services Architecture, wherein the MSA provides a plurality of microservices in order to support portability.

* * * * *